US012730832B2

(12) United States Patent
Knipmeyer

(10) Patent No.: US 12,730,832 B2
(45) Date of Patent: Sep. 8, 2026

(54) SYSTEM AND METHODS FOR DATA QUERYING AND RETRIEVAL

(71) Applicant: State Farm Mutual Automobile Insurance Company, Bloomington, IL (US)

(72) Inventor: Kevin Knipmeyer, Sebastian, FL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 0 days.

(21) Appl. No.: 18/928,681

(22) Filed: Oct. 28, 2024

(65) Prior Publication Data

US 2026/0111468 A1 Apr. 23, 2026

Related U.S. Application Data

(60) Provisional application No. 63/710,220, filed on Oct. 22, 2024.

(51) Int. Cl.
*G06F 16/334* (2025.01)
*G06F 16/338* (2019.01)

(52) U.S. Cl.
CPC ........ *G06F 16/3344* (2019.01); *G06F 16/338* (2019.01)

(58) Field of Classification Search
CPC ............... G06F 16/3344; G06F 16/338; G06F 16/3329; G06F 16/3347; G06F 40/30;
(Continued)

(56) References Cited

U.S. PATENT DOCUMENTS 12,013,884 B2 * 6/2024 Dana ........................ G06F 40/30
12,141,181 B2 * 11/2024 Gutta .................... G06F 40/216
(Continued)

FOREIGN PATENT DOCUMENTS

WO WO-2025107166 A1 * 5/2025 ....... G06F 16/24522

OTHER PUBLICATIONS

Wang et al. "Matching Biomedical Ontologies via a Hybrid Graph Attention Network"; Sec. Computational Genomics vol. 13—2022 | https://doi.org/10.3389/fgene.2022.893409; Jul. 21, 2022 (Year: 2022).*

(Continued)

*Primary Examiner* — Dennis Truong
(74) *Attorney, Agent, or Firm* — Bookoff McAndrews, PLLC

(57) ABSTRACT

Systems and methods for generating a response to natural language queries are disclosed. The computer-implemented method may include, such as by one or more processors, transceivers, and/or sensors: (1) receiving natural language queries from user devices; (2) generating an information query based upon the natural language queries, wherein the information query identifies data elements for responding to the natural language queries; (3) converting the information query into an embedded vector corresponding to a data schema vector index; (4) based upon the embedded vector representation, utilizing a graph neural network (GNN)-based model to retrieve a plurality of ontologies from data sources; (5) generating a structured query based upon a pattern and the plurality of ontologies; (6) executing the structured query upon the data sources to retrieve a result for the information query; (7) generating the result to the natural language queries; and/or (8) presenting the result to the user devices.

20 Claims, 5 Drawing Sheets

(58) Field of Classification Search
CPC ............... G06F 16/31; G06F 16/24522; G06F 16/9024; G06F 40/20; G06N 20/00; G06N 3/045
See application file for complete search history.

(56) References Cited

U.S. PATENT DOCUMENTS

| | | | | |
|---|---|---|---|---|
| 12,254,029 | B1 * | 3/2025 | Veillon | G06F 16/285 |
| 12,332,896 | B1 * | 6/2025 | Xu | G06F 16/24549 |
| 2010/0042607 | A1 * | 2/2010 | Min | G06F 16/2462 707/718 |
| 2010/0082655 | A1 * | 4/2010 | Silberstein | G06F 16/2455 707/E17.014 |
| 2010/0332660 | A1 * | 12/2010 | Fonseca | G06F 16/2455 709/224 |
| 2024/0028629 | A1 * | 1/2024 | Gutta | G06F 16/31 |
| 2024/0404687 | A1 * | 12/2024 | Bell | G06Q 10/0633 |
| 2024/0406166 | A1 * | 12/2024 | Bell | G06N 3/045 |
| 2025/0156634 | A1 * | 5/2025 | Klafter | G06F 16/953 |
| 2025/0247211 | A1 * | 7/2025 | Roopan | H04L 9/0822 |
| 2025/0265306 | A1 * | 8/2025 | Toshniwal | G06F 17/11 |
| 2025/0335715 | A1 * | 10/2025 | Kumaresan | G06F 16/24522 |

OTHER PUBLICATIONS

Xiao et al. "Ontology-Based Data Access: A Survey"; IJCAI'18: Proceedings of the 27th International Joint Conference on Artificial Intelligence; pp. 5511-5519;Jul. 13, 2018 (Year: 2018).*

Wang, Bailin, et al. "Rat-sql: Relation-aware schema encoding and linking for text-to-sql parsers." arXiv preprint arXiv:1911.04942 (2019) (Year: 2019).*

Lewis, Patrick, et al. "Retrieval-augmented generation for knowledge-intensive nlp tasks." Advances in neural information processing systems 33 (2020): 9459-9474 (Year: 2020).*

Yin, Pengcheng, et al. "TaBERT: Pretraining for joint understanding of textual and tabular data." arXiv preprint arXiv:2005.08314 (2020). (Year: 2020).*

Zheng, Huaixiu Steven, et al. "Take a step back: Evoking reasoning via abstraction in large language models." arXiv preprint arXiv:2310.06117 (2023) (Year: 2023).*

Sun et al. ("SQL-PaLM: Improved large language model adaptation for Text-to-SQL (extended)"; https://arxiv.org/pdf/2306.00739; Mar. 30, 2024) (Year: 2024).*

A. D. Awasare. (2024). Advancements in G-Code Programming. Recent Trends in Automation and Automobile Engineering, 7(2), 1-5. https://doi.org/10.5281/zenodo.11173284.

Application management services | IBM. (n.d.). https://www.ibm.com/consulting/applications.

Azzawe, Hamid (Apr. 30, 2024). How TigerGraph CoPilot enables graph-augmented AI. InfoWorld. https://www.infoworld.com/article/2337106/how-tigergraph-copilot-enables-graph-augmented-ai.html.

Bagherzadeh, Mojtaba & Jahed, Karim & Combemale, Benoit & Dingel, Juergen. (2021). Live Modeling in the Context of State Machine Models and Code Generation. Software and Systems Modeling. 10.1007/s10270-020-00829-y. https://www.researchgate.net/publication/344225034_Live_Modeling_in_the_Context_of_State_Machine_Models_and_Code_Generation.

Bajwa, A., & Yang, C. J. (May 27, 2024). The RAG Stack: featuring knowledge graphs. Software Synthesis. https://akashbajwa.substack.com/p/the-rag-stack-featuring-knowledge.

Ben-Efraim, N. (n.d.). Leveraging Knowledge Graphs with Azure OpenAI. techcommunity.microsoft.com. https://techcommunity.microsoft.com/t5/azure-architecture-blog/leveraging-knowledge-graphs-with-azure-openai/ba-p/4093233.

Chambers, Ben, Knowledge Graphs for RAG without a GraphDB. DataStax. https://www.datastax.com/blog/knowledge-graphs-for-rag-without-a-graphdb.

Copado Robotic testing for all testing scenarios. (n.d.). https://www.copado.com/product-overview/copado-robotic-testing.

Data Pipeline Automation | ActiveBatch Workload Automation. (n.d.). https://activebatch.advsyscon.com/lp/data-pipeline-automation.

Dbt-labs. (n.d.). Make it possible for DBT to generate models from a piece of JINJA code • dbt-labs/dbt-core • Discussion #5101. GitHub. https://github.com/dbt-labs/dbt-core/discussions/5101.

Demo: CRM Introduction. (n.d.). Salesforce.com. https://www.salesforce.com/form/demo/product-demos/.

Dynamic Code generation. (n.d.). https://www.cs-script.net/cs-script/help-legacy/dcg.html#:~:text=Dynamic%20Code%20Generation%20(DCG)%20is,business%20logic%20independent%20code%20fragments.

Dynamic code generation: def as an exception in Macro expansion prioritisation. Understanding Macro.escape(var, unquote: true) Injection vs Transfer. (May 17, 2024). Elixir Programming Language Forum. https://elixirforum.com/t/dynamic-code-generation-def-as-an-exception-in-macro-expansion-prioritisation-understanding-macro-escape-var-unquote-true-injection-vs-transfer/63637.

Electrical and Computer Engineering (EECE) < Northeastern University Academic Catalog. (n.d.). Northeastern University Academic Catalog. https://catalog.northeastern.edu/course-descriptions/eece/.

Henry Watson. (Jul. 1, 2024). Building a knowledge graph. Microsoft Learn. https://learn.microsoft.com/en-us/devsecops/playbook/Capabilities/observability/knowledge-graph.

Neo4j. (Nov. 8, 2023). Going Meta—Ep 22: RAG with Knowledge Graphs [Video]. YouTube. https://www.youtube.com/watch?v=9DxwgIKVSHY.

Neo4j. (Sep. 11, 2024). Knowledge Graph—Graph Database & Analytics. Graph Database & Analytics. https://neo4j.com/use-cases/knowledge-graph/.

Neo4j. (Jan. 5, 2024a). Going Meta—Ep 24: KG+LLMs: Ontology driven RAG patterns [Video]. YouTube. https://www.youtube.com/watch?v=5_WXr0GtVas.

Ocassionally secure: A comparative analysis of code generation assistants. (n.d.). https://arxiv.org/html/2402.00689v1.

Palantir. (Nov. 29, 2023). Building with Palantir AIP: Semantic Search—Palantir Blog. Medium. https://blog.palantir.com/building-with-palantir-aip-semantic-search-dc3adf40f6a6.

Product Documentation | ServiceNow. (n.d.). https://docs.servicenow.com/bundle/washingtondc-application-development/page/script/now-assist-for-code/concept/configuring-now-assist-code.html.

Product Documentation | ServiceNow. (n.d.-b). https://docs.servicenow.com/bundle/washingtondc-intelligent-experiences/page/administer/now-assist-platform/concept/now-assist-text-to-code.html.

Prompt Engineering. (n.d.). Open AI Platform. https://platform.openai.com/docs/guides/prompt-engineering.

Stardog. (n.d.). Data Fabric Whitepaper | Stardog. https://info.stardog.com/data-fabric-vendor-ppc.

SupportAI Overview—TigerGraph CoPilot. (n.d.). TigerGraph Documentation. https://docs.tigergraph.com/tg-copilot/intro/supportai-overview.

The changing role of AI in CX. (n.d.). Nice. https://www.nice.com/resources/the-changing-role-of-ai-in-cx.

Upgrade your reporting with Domo. | Domo. (n.d.). https://www.domo.com/business-intelligence/reporting-and-analytics.

Xu, F. F., Vasilescu, B., & Neubig, G. (2022). In-IDE Code Generation from Natural Language: Promise and Challenges. ACM Transactions on Software Engineering and Methodology, 31(2), 1-47. https://doi.org/10.1145/3487569.

Zjukg. (n.d.). GitHub—zjukg/KG-LLM-Papers: [Paper List] Papers integrating knowledge graphs (KGs) and large language models (LLMs). GitHub. https://github.com/zjukg/KG-LLM-Papers.

* cited by examiner

SYSTEM AND METHODS FOR DATA QUERYING AND RETRIEVAL

CROSS-REFERENCE TO RELATED APPLICATION

This patent application claims the benefit of priority to U.S. Provisional Application No. 63/710,220, filed on Oct. 22, 2024, the entirety of which is incorporated herein by reference.

TECHNICAL FIELD

This present disclosure relates generally to the field of data processing and artificial intelligence systems. In particular, the present disclosure relates to generating responses to natural language queries using intelligent query refinement, graph-based data representations, and context-aware schema mapping through vector embeddings.

BACKGROUND

Conventional retrieval-augmented generation (RAG) systems may be utilized to provide responses to user generated queries. For example, when generating a response to a user query, the conventional RAG systems primarily focus upon retrieving and leveraging previously provided responses to previous queries. Such conventional techniques may limit the conventional RAG systems adaptability to new contexts. Additionally, such systems may be challenged by their reliance upon pre-defined answers, making them inadequate when the data context changes dynamically or when the needed information is based upon evolving business metadata.

Furthermore, existing methods may be technically challenged in real-time integration of business ontology and environment context, leading to mismatches between user queries and data retrieval. This limitation may hinder the ability of the conventional retrieval-augmented generation systems to provide up-to-date responses that align with the current operational context of the business. Conventional methods may further include additional ineffectiveness, encumbrances, inefficiencies, and other drawbacks, as well.

SUMMARY

The present embodiments may relate, inter alia, to solving one or more technical challenges, such as those discussed herein, by implementing a dynamic step back RAG method that leverages a graph neural network (GNN) based representation of metadata (e.g. business metadata), for the extraction and the processing of relevant data to generate precise responses tailored to the current data.

Specifically, the present computer systems and computer-implemented methods may solve technical challenges by employing a flexible step back RAG method that integrates a GNN-based model to represent metadata (e.g., business metadata). This approach may facilitate the understanding of intricate relationships between various business entities, schemas, and contextual data points. This method may allow for real-time extraction, processing, and aggregation of relevant data, dynamically adjusting the query scope based upon the current context, even when exact prior responses are unavailable.

In one aspect, a computer-implemented method for generating a response to one or more natural language queries may be provided. The computer-implemented method may be implemented via one or more local or remote processors, servers, transceivers, memory units, mobile devices, voice bots or chatbots, ChatGPT bots, InstructGPT bots, Codex bots, Google Bard bots, and/or other electronic or electrical components, which may be in wired or wireless communication with one another and/or each operate as an input and/or output device. In one instance, the computer-implemented method may be performed by one or more local or remote processors of a computing system in communication with one or more local or remote data sources.

The computer-implemented method may include, via one or more local or remote processors, transceivers, sensors, and/or other components: (1) receiving, by the one or more processors, the one or more natural language queries from one or more user devices; (2) generating, by the one or more processors, an information query based upon the one or more natural language queries, wherein the information query identifies one or more data elements for responding to the one or more natural language queries; (3) converting, by the one or more processors, the information query into an embedded vector corresponding to a data schema vector index; (4) based upon the embedded vector representation, utilizing, by the one or more processors, a graph neural network (GNN)-based model to retrieve a plurality of ontologies from the one or more data sources; (5) generating, by the one or more processors, a structured query based upon a pattern and the plurality of ontologies; (6) executing, by the one or more processors, the structured query upon the one or more data sources to retrieve a result for the information query; (7) generating, by the one or more processors, the result to the one or more natural language queries; and/or (8) presenting, by the one or more processors, the result to the one or more user devices. The method may include additional, less, or alternate functionality, including that discussed elsewhere herein.

In another aspect, a computer system for generating a response to one or more natural language queries may be provided. The computer system may be implemented via one or more local or remote processors, servers, transceivers, memory units, mobile devices, voice bots or chatbots, ChatGPT bots, InstructGPT bots, Codex bots, Google Bard bots, and/or other electronic or electrical components, which may be in wired or wireless communication with one another. In one instance, the computer system may be performed by one or more local or remote processors of a computing system in communication with one or more local or remote data sources, and at least one non-transitory computer readable medium storing instructions which, when executed by the one or more processors, cause the one or more processors to perform certain operations. The system may include, via one or more processors, non-transitory computer readable medium, transceivers, sensors, and/or other components to perform operations that may include: (1) receiving the one or more natural language queries from one or more user devices; (2) generating an information query based upon the one or more natural language queries, wherein the information query identifies one or more data elements for responding to the one or more natural language queries; (3) converting the information query into an embedded vector corresponding to a data schema vector index; (4) based upon the embedded vector representation, utilizing a GNN-based model to retrieve a plurality of ontologies from one or more data sources; (5) generating a structured query based upon a pattern and the plurality of ontologies; (6) executing the structured query upon the one or more data sources to retrieve a result for the information query; (7) generating the result to the one or more natural language queries; and/or (8) presenting the result to the one or more user devices. The system may include additional, less, or alternate functionality, including that discussed elsewhere herein.

In yet another aspect, a non-transitory computer readable medium for generating a response to one or more natural language queries may be provided. The non-transitory computer readable medium may be implemented via one or more local or remote processors, servers, transceivers, memory units, mobile devices, voice bots or chatbots, ChatGPT bots, InstructGPT bots, Codex bots, Google Bard bots, and/or other electronic or electrical components, which may be in wired or wireless communication with one another. In one instance, the non-transitory computer readable medium may be performed by one or more local or remote processors of a computing system in communication with one or more local or remote data sources, and at least one non-transitory computer readable medium storing instructions which, when executed by the one or more processors, cause the one or more processors to perform certain operations. The non-transitory computer readable medium may include, via one or more processors, transceivers, sensors, and/or other components: (1) receiving the one or more natural language queries from one or more user devices; (2) generating an information query based upon the one or more natural language queries, wherein the information query identifies one or more data elements for responding to the one or more natural language queries; (3) converting the information query into an embedded vector corresponding to a data schema vector index; (4) based upon the embedded vector representation, utilizing a GNN-based model to retrieve a plurality of ontologies from one or more data sources; (5) generating a structured query based upon a pattern and the plurality of ontologies; (6) executing the structured query upon the one or more data sources to retrieve a result for the information query; (7) generating the result to the one or more natural language queries; and/or (8) presenting the result to the one or more user devices. The operations may include additional, less, or alternate functionality, including that discussed elsewhere herein.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

Figure 1:
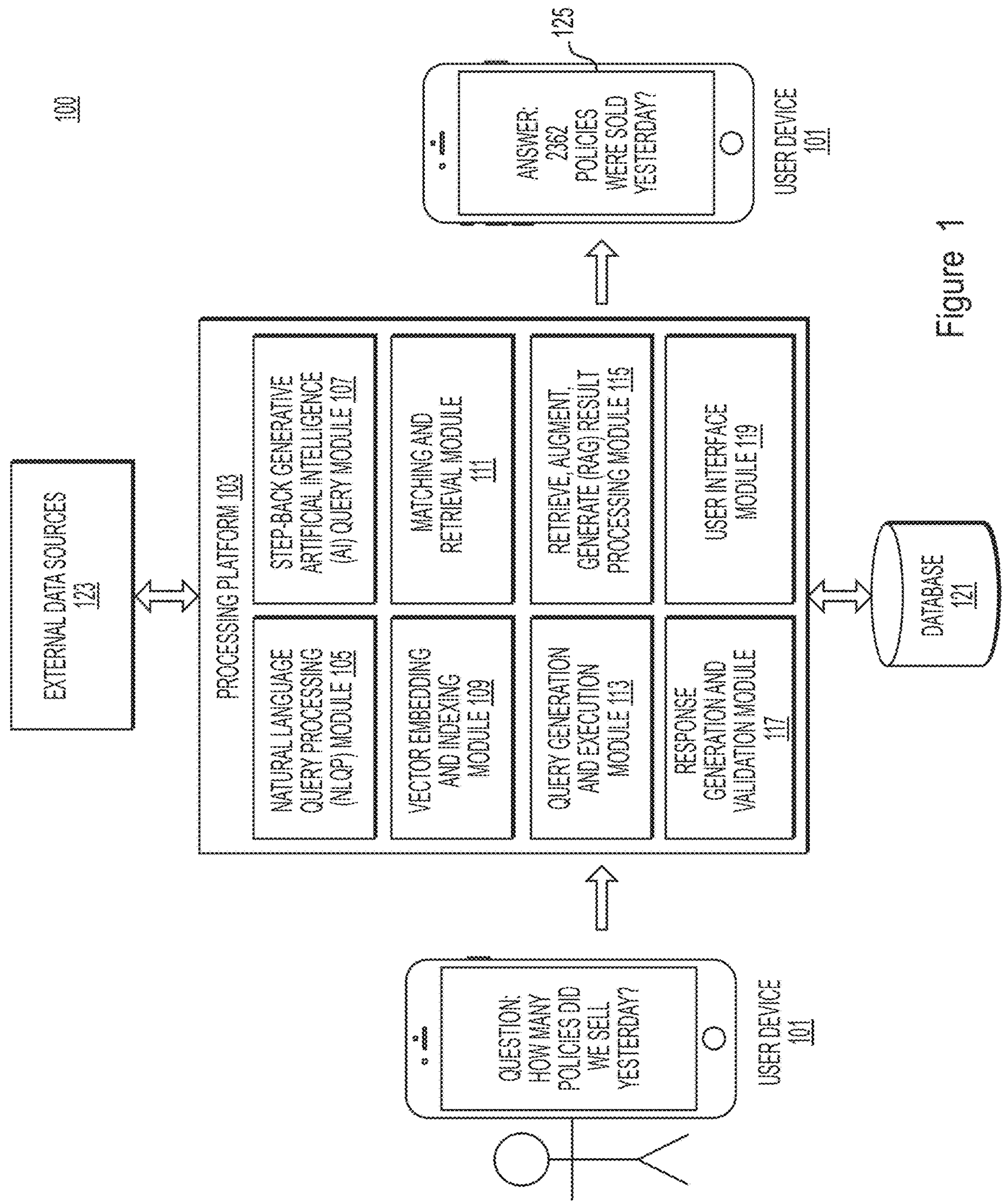
FIG. 1 is a diagram showing an exemplary computer system that integrates the step back RAG methods with GNN-based models to enable the contextual matching of metadata, as well as facilitating the real-time extraction and processing of relevant data, according to certain aspects of the disclosure.

Advantages will become more apparent to those skilled in the art from the following description of the preferred embodiments that have been shown and described by way of illustration. As will be realized, the present embodiments may be capable of other and different embodiments, and their details are capable of modification in various respects. Accordingly, the drawings and description are to be regarded as illustrative in nature and not as restrictive.

DETAILED DESCRIPTION

The present embodiments may relate, inter alia, to a system for processing natural language queries, even when the requested information has not been previously provided. The users may ask questions about current data, and the step back RAG method may map the questions to relevant metadata (e.g., business metadata) to identify gaps in the available data and any needs for additional information. A GNN-based model may be integrated in the system to embed the step back RAG method with a graph-based representation of the business ontology and environment context. This may enable the system to recognize complex relationships and dependencies between business entities, taxonomies, schemas, and environments. Once the business context is matched using the step back RAG method and the GNN-based model, the matched context may be applied to a copilot automated code to generate the queries for extracting real-time data and performing new aggregations. This extracted data may then be fed back into the step back RAG pattern, ensuring that the query may be iteratively refined until the query accurately answers the user's questions.

By way of background information, conventional methods for processing natural language queries may often rely upon pre-generated responses, which may significantly limit the queries ability to handle dynamic and evolving data needs. These systems may typically match queries against previously provided answers or fixed knowledge bases, making them ineffective when dealing with queries that may need real-time information or situations where no prior answers exist. Furthermore, these methods may lack the capability to dynamically adjust queries based upon a business metadata context, leading to incomplete or inaccurate results.

Additionally, conventional systems may lack the ability to leverage the complex relationships and interdependencies between different business components, such as taxonomies, data schemas, and organizational environments. The conventional systems may often be rigid in structure, lacking mechanisms to dynamically extract, aggregate, and process data based upon context. The traditional methods may also be technically challenged in supporting real-time code generation or refining queries based upon changing requirements. Such an absence of contextual matching, particularly in dynamic environments, may limit the flexibility of these systems, making them less efficient in addressing complex queries that may need deeper insights or retrieval of current, up-to-date responses.

As a result, there is a need for advanced data-driven models, methods, and tools for implementing a dynamic step back retrieval-augmented generation (RAG) method that leverages a graph neural network (GNN) based representation of metadata (e.g. business metadata), for the extraction and the processing of relevant data to generate precise responses tailored to the current data.

Exemplary Computer System

To address technical challenges such as the above, computing system 100 of FIG. 1 improves the state of conventional technologies by integrating a dynamic step back RAG method with one or more GNN-based models that enable the contextual matching of metadata, thereby facilitating the real-time extraction and processing of relevant data. This architecture may enhance adaptability in querying, ensuring that natural language inquiries yield accurate and timely responses, even in the absence of previously provided answers.

In one example, users may submit queries (e.g., natural language queries) utilizing their devices (e.g., user device 101). The computing system 100 may capture the queries and identify key entities. The computing system 100 may utilize the step back RAG method for analyzing the queries and may determine missing data or a need for new data (e.g., real-time data) for responding to the queries. The step back RAG method may adjust the scope of the queries, and the query elements may be transformed into a vector representation that may be mapped to relevant data (e.g., data schema, taxonomy, etc.). The computing system 100 may utilize the GNN-based models to match the embedded vectors to relevant nodes (e.g., data points) and edges (e.g., connections between the data points) within the graph, retrieving relevant data sources that include the necessary information (e.g., missing data or new data). The computing system 100 may then generate an actionable query that may allow for the efficient retrieval of the needed information from the identified data sources. The system may input the retrieved data into the step back RAG method, ensuring an iterative refinement until accurate answers to the users' queries are generated (e.g., comparing the retrieved data against predefined criteria, such as completeness of the required data elements and relevance score). The computing system 100 may structure the response to reflect the specific context of the queries and may display the response upon the user interface of the user's devices.

FIG. 1 is a diagram showing an exemplary computer system that integrates the step back RAG methods with GNN-based models to enable the contextual matching of metadata, facilitating the real-time extraction and processing of relevant data, according to certain aspects of the disclosure. FIG. 1 includes the computing system 100 that includes a user device 101 (or mobile device, wearable, smart glasses, VR headset, AR glasses, etc.), a processing platform 103, a database 121, and external data sources 123. It should be understood that other implementations of computing system 100 may omit one or more of the foregoing components and/or may include additional components, as the case may be.

In one scenario, users may interact with computing system 100 by speaking or typing the user's query in the user interface of the user device 101 (e.g., a smart mobile communication device, a wireless communication device, a multimedia tablet, a notebook computer, VR headset, AR glasses, wearable, smart glasses, mobile device, etc.). As the user articulates the user's queries, the computing system 100 may capture these natural language queries, recognize key terms, and translate them into the format suitable for processing.

The various elements of the computing system 100 may communicate with each other through a communication network. In one instance, the user device 101 may include a network detection sensor for detecting wireless signals or receivers for different communications (e.g., Bluetooth, Wi-Fi, Li-Fi, near field communication (NFC), etc.) from the communication network. The communication network may support a variety of different communication protocols and communication techniques.

In one instance, the communication network may allow the user device 101 (or one or more user devices) to communicate with the processing platform 103. The communication network may include one or more networks such as a data network, a wireless network, a telephony network, or any combination thereof. It is contemplated that the data network is any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network is, for example, a cellular communication network and employs various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one instance, the processing platform 103 may include a platform with multiple interconnected components. The processing platform 103 may include one or more servers, intelligent networking devices, computing devices, components, and corresponding software for processing queries, dynamically refining and matching contextual metadata using a step back RAG method and one or more GNN-based models, retrieving and processing relevant data, and delivering real-time, accurate responses.

In one instance, the processing platform 103 may receive a query (e.g., a natural language query) from a user device (e.g., user device 101). The processing platform 103 may utilize the step back RAG method to process the query and generate an information query that identifies data elements needed for responding to the query. The system may convert the information query into an embedded vector representation that conforms to a data schema vector index. The processing platform 103 may then utilize the one or more GNN-based models to match the embedded vectors to relevant nodes and edges within the graph, and may retrieve relevant data sources that include the matched data elements. The system may generate a structured query (e.g., an actionable query) for the efficient retrieval of the necessary information from the data sources. The processing platform 103 may execute the structured query to retrieve the data elements from the data sources. The system may then input the retrieved data into the step back RAG method, ensuring an iterative refinement until accurate answers to the user's queries are generated.

This approach improves upon the conventional methods by integrating the Step Back RAG method with GNN-based models for dynamic, context aware query refinement that adapts to real-time business metadata. For example, by leveraging contextual matching through GNN-based models, this approach may dynamically refine queries and pull relevant data efficiently. Accordingly, this approach may significantly accelerate the ability to query and retrieve answers from various data catalogs by reducing the cost and time needed to interpret user requests and develop the logic needed to compute and provide answers.

Unlike the traditional methods that match previously provided answers, this computer-implemented method may match queries against dynamic business context and metadata, allowing for precise and relevant data extraction. Additionally, the computer-implemented method may train or provide context insights to existing system by sharing the derived context and recommended implementations, allowing for more informed, data-driven decisions.

In one instance, the processing platform 103 may include a natural language query processing (NLQP) module 105, a step-back generative artificial intelligence (AI) query module 107, a vector embedding and indexing module 109, a matching and retrieval module 111, a query generation and execution module 113, a retrieve, augment, and generate (RAG) result processing module 115, a response generation and validation module 117, and a user interface module 119, or any combination thereof. As used herein, terms such as "component" or "module" generally encompass hardware and/or software, e.g., that a processor or the like used to implement associated functionality. It is contemplated that the functions of these components are combined in one or more components or performed by other components of equivalent functionality.

In one instance, the NLQP module 105 may capture the user's natural language query and break it into meaningful components through natural language processing (NLP) techniques, such as parsing and semantic analysis. Once the query is parsed, the NLQP module 105 may extract the semantic information, identifying key entities, relationships, and intents, by leveraging advanced machine-learning models like named entity recognition (NER) and intent classification. The extracted semantic elements may be mapped to the relevant business metadata contexts, such as data schema, entities, and relationships. This contextual understanding may ensure that the computing system 100 identifies which database and schema structures are needed to fulfill the query. The NLQP module 105 may formulate one or more information queries that may serve as input for downstream processes, such as data retrieval and query execution. By bridging the gap between unstructured natural language input and structured data processing, the NLQP module 105 may facilitate context-aware query handling.

In one instance, the step-back generative AI Query module 107 may analyze the natural language query to identify any missing or unclear data elements needed for generating a complete response. The step-back generative AI Query module 107 may formulate additional queries to gather necessary context or data not provided in the information query by the NLQP module 105. The step-back generative AI Query module 107 may dynamically adjust the scope of the information query by determining which additional data points of schema elements are essential to the user's natural language query. In one instance, the step-back generative AI Query module 107 may utilize a GNN framework to facilitate a contextual understanding of the business metadata, enabling it to analyze relationships and hierarchies among key entities within the data. By embedding the RAG component within the GNN framework, the step-back generative AI Query module 107 may effectively match the user's query against the dynamic business ontology and environment context.

In another instance, the step-back generative AI Query module 107 may utilize machine-learning models to enhance the contextual understanding of queries and may dynamically adjust query parameters based upon learned patterns from historical queries and data retrieval successes. Furthermore, the step-back generative AI Query module 107 may support an iterative approach to query processing, allowing for continuous refinement until the required data is collected.

After parsing the information query and mapping the extracted semantic data to the relevant business schema, the vector embedding and indexing module 109 may encode the mapped semantic data into an embedded vector representation. For example, the vector embedding and indexing module 109 may translate the structured data (e.g., entities, relationships, and attributes) into numerical vectors that may represent their positions in a predefined vector space. The vector embedding and indexing module 109 may utilize machine-learning techniques (e.g., Word2Vec, BERT) to create an embedded vector based upon queries and data, helping to map semantic information into vector space. This encoding may capture the relationships between different data points in a way that reflects the semantic meaning of those data points. By encoding the data schema into vectors, the computing system 100 may perform fast similarity searches within the vector space, enabling the efficient retrieval of matching schema elements or contexts based upon the user's natural language query.

In one instance, the matching and retrieval module 111 may identify and retrieve the relevant data. For example, in response to the encoded vector representation, the matching and retrieval module 111 may employ advanced algorithms to compare the embedded vectors derived from the information query against a pre-indexed database of existing data schema and business metadata. In one example, the matching and retrieval module 111 may perform similarity searches within the vector space, leveraging techniques such as a cosine similarity or nearest neighbor searches, in order to find matches between the user's query vector and the stored vectors. This technique may allow for the efficient identification of the most relevant schema elements that correspond to the original information query. In addition, the matching and retrieval module 111 may integrate a feedback mechanism to continuously improve its matching accuracy over time. For example, by learning from previous query results and user interactions, the matching and retrieval module 111 may refine its algorithms and update its indexing strategies to align with user needs and business context.

In one instance, the query generation and execution module 113 may transform the matched data from the previous modules (e.g., matching and retrieval module 111) into actionable queries (e.g., structured queries) that may be executed against the underlying database. For example, the query generation and execution module 113 may analyze the matched schema elements to construct SQL and other query formats tailored to the specific database technology. Once the queries are formulated, the query generation and execution module 113 may execute the formulated queries against the database for efficient data retrieval. This targeted approach may minimize the time and resources required to access the necessary data, resulting in a faster response time. The query generation and execution module 113 may be configured to accommodate different types of databases and query languages. This flexibility may ensure that the computing system 100 can interact seamlessly with various databases while maintaining high performance and reliability.

In one instance, the RAG result processing module 115 may transform raw data outputs into meaningful, contextualized information that aligns with the user's original query intent. For example, the raw data retrieved from one or more databases (e.g., database 121) may be analyzed and processed to extract relevant insights. This may involve organizing the data into a structured format and identifying key patterns, relationships, or anomalies. The RAG result processing module 115 may implement an augmentation technique to enrich the raw data with supplementary information from external sources, such as business ontologies or metadata for a comprehensive understanding of the result. Following the augmentation process, the RAG result processing module 115 may generate a coherent output tailored to the user's needs. This may include summarizing the findings or creating a visual representation of the data for better understanding. The RAG result processing module 115 may incorporate a feedback mechanism that allows it to learn from user interactions and improve its processing capabilities over time.

In one instance, the response generation and validation module 117 may transform the processed insights from the RAG result processing module 115 into structured responses tailored to the user's original query. For example, the response generation and validation module 117 may integrate contextual information to enhance the relevance of the response to align with the user's specific needs. The response generation and validation module 117 may implement validation checks to ensure the accuracy and reliability of the information presented (e.g., cross-verify the responses against known data sources to minimize errors). The response generation and validation module 117 may collect feedback upon the response provided, allowing for continuous improvement of response quality and relevance.

In one instance, the user interface module 119 may present information to one or more users in a manner that is visually appealing and easy to navigate, enabling the users to effectively engage with the natural language query processing and data retrieval functionalities (e.g., display 125 in the user device 101). In one example, the user interface module 119 may incorporate user-friendly designs to create an intuitive interface that allows users to easily input queries, which may be enhanced with suggestions or prompts to guide the user in formulating their questions. In one example, the user interface module 119 may present the results from the RAG result processing module 115 in a structured format using various visual aids to enhance user comprehension. The user interface module 119 may incorporate a feature for users to provide feedback regarding the quality and relevance of responses, thereby facilitating the continuous improvement of the system.

The user interface module 119 may employ various application programming interfaces (APIs) or other function calls corresponding to the application upon the user device 101, thus enabling the display of graphics primitives such as graphs, edges, icons, menus, buttons, data entry fields, etc. The user interface module 119 may also include a variety of interfaces, for example, interfaces for data input and output devices, referred to as I/O devices, storage devices, and the like. Still further, the user interface module 119 may be configured to operate in connection with augmented reality (AR) processing techniques, wherein various applications, graphic elements, and features interact.

In one instance, the database 121 may include any type of database, such as a relational database, a hierarchical database, an object-oriented database, and/or the like, wherein the data may be organized in any suitable manner, including data tables or lookup tables. The database 121 may serve as a structured repository for storing, organizing, and managing data efficiently, enabling quick retrieval and manipulation of information. It may utilize a relational model to establish relationships between data entities, ensuring that the related data can be easily accessed and queried. With a robust schema that defines the data types, attributes, and relationships, the database 121 may support complex queries and transactions, facilitating seamless data operations. In one instance, the database 121 may incorporate vector-based indexing techniques to handle high-dimensional data, such as embedding vectors from machine-learning models. These vectors may capture semantic relationships between data, allowing for similarity searches and matching.

In one instance, external data sources may include third-party APSs, external business reports, environmental data, or data from other companies and systems that may enrich the database 121 by providing diverse and comprehensive information that may be integrated into the system. The external data sources 123 may include:

(i) Taxonomy: A hierarchical classification of data into one or more categories or groups based upon characteristics.

(ii) Business context: A specific business-related aspect of the data, including market trends, customer insights, and operational metrics.

(iii) Schema: Defines the structure of data in a database, outlining how data elements are related to each other. It is important to ensure that external data sources are integrated correctly into the system.

(iv) Environment: External factors and conditions that may affect the data or the context in which it is applied.

(v) Vector Index: The use of high-dimensional vectors to represent and organize data, especially in cases where semantic relationships or similarities are important.

(vi) Lineage: Data lineage tracks the origin, movement, and transformation of data across the system.

(vii) Ontology: A formal representation of knowledge by defining concepts, categories, and relationships within a specific domain.

By incorporating these elements from the external data sources 123 the computing system 100 may ensure that diverse, high-quality data are available. It should be understood that external data sources 123 may include any other databases that provide relevant information pertaining to the user's queries.

The above presented modules and components of the processing platform 103 may be implemented in hardware, firmware, software, or a combination thereof. Though depicted as a separate entity in FIG. 1, it is contemplated that the processing platform 103 may be implemented for direct operation by the respective user device 101. As such, the processing platform 103 may generate direct signal inputs by way of the operating system of the user device 101. In one instance, one or more of the modules 105-119 may be implemented for operation by the respective user device 101, as the processing platform 103. The various executions presented herein contemplate any and all arrangements and models.

Exemplary Generating Responses to Natural Language Queries Flowchart

Figure 2:
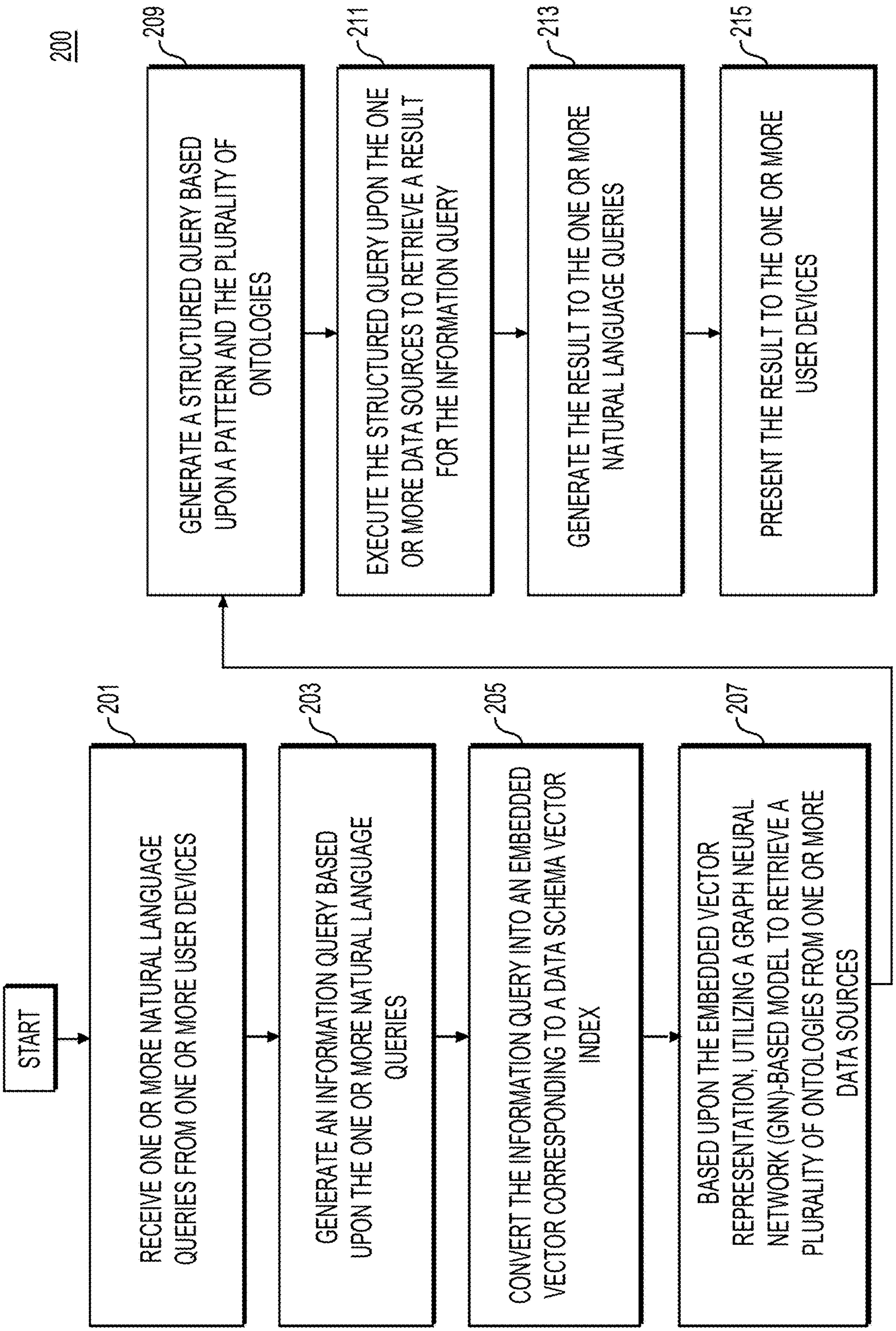
FIG. 2 is an exemplary flowchart of a computer-implemented or computer-based process for generating a response to one or more natural language queries, according to certain aspects of the disclosure.
Figure 5:
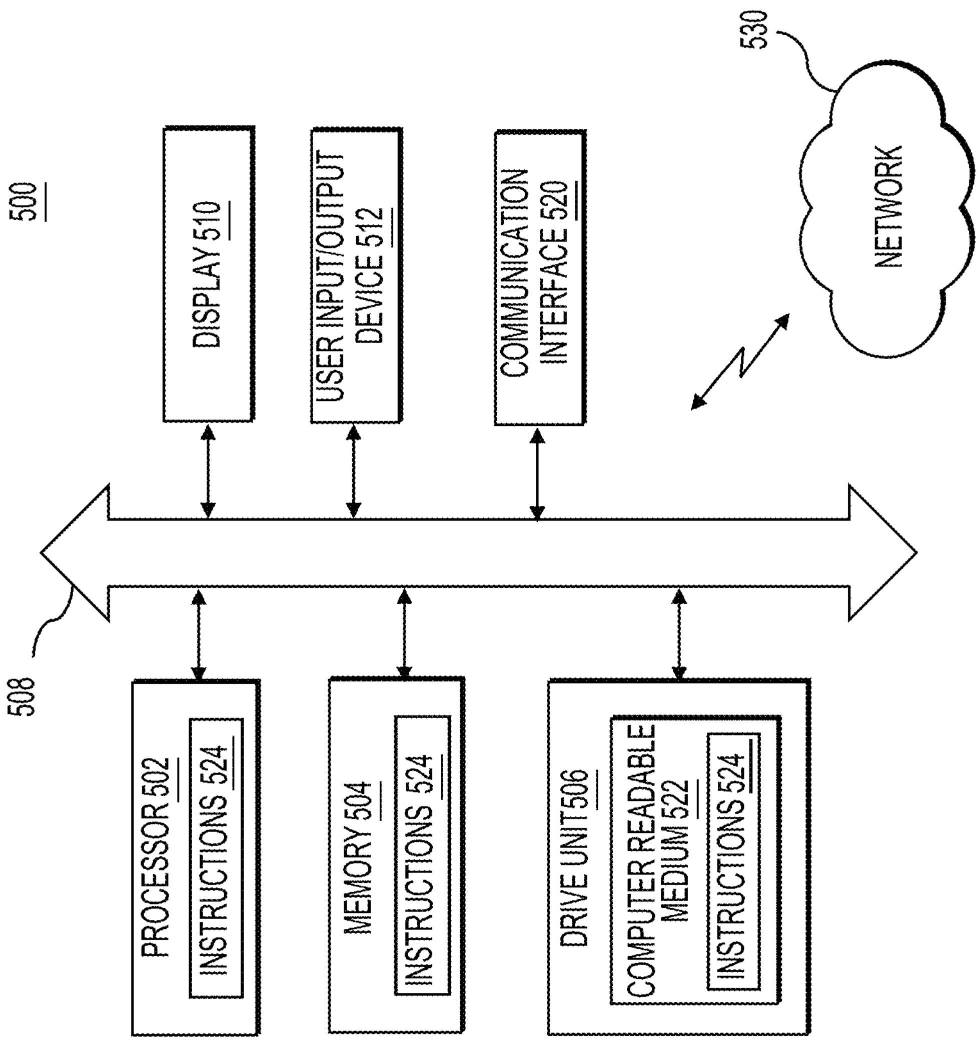
FIG. 5 illustrates an implementation of an exemplary computer system that executes techniques presented herein.

FIG. 2 is an exemplary flowchart of a computer-implemented or computer-based process for generating a response to one or more natural language queries. In one instance, the processing platform 103 and/or any of the modules 105-119 may perform one or more portions of the process 200 and are implemented using, for instance, a chip set including a processor (e.g., processor 502) and a memory (e.g., memory 504) as shown in FIG. 5. As such, the processing platform 103 and/or any of modules 105-119 may be configured to facilitate accomplishing various parts of the process 200, as well as accomplishing embodiments of other processes described herein in conjunction with other components of the computing system 100. Although the process 200 is illustrated and described as a sequence of actions, operations, and/or functionality, it is contemplated that various embodiments of the process 200 may be performed in any order or combination and need not include all of the illustrated actions, operations, and/or functionality.

In block 201, the processing platform 103 may receive natural language queries (e.g., general business inquiries or data-related requests) from the user device(s) (e.g., user device 101). The processing platform 103 may parse the natural language queries for identifying key entities and contexts. This may involve utilizing a natural language processing engine (e.g., a semantic analysis tool or a machine-learning based language model) for extracting critical information, such as keywords and phrases that indicate the user's intent. The processing platform 103 may process this information to understand the core entities being referenced and the contextual elements that define the scope and purpose of the user's request.

In block 203, the processing platform 103 may generate, utilizing a step back retrieval-augmented generation (RAG) method, an information query based upon the natural language queries. The information query may identify data elements for responding to natural language queries. In one instance, the step back RAG method may enhance traditional RAG models by iteratively refining the query. For example, instead of relying upon previously provided answers, it "steps back" to analyze additional information needed to resolve the user's queries. In one embodiment, the processing platform 103 may identify, utilizing the step back RAG method, data sources and schema structures that are relevant to the key entities and the contexts. By leveraging previously gathered metadata, the processing platform 103 may map the query's entities to available data, ensuring all pertinent sources are considered. After identifying the relevant data sources and schema structures, the processing platform 103 may formulate the information query using the step back RAG method. This may involve referencing the data sources and the schema structures to specify any missing data elements needed for responding to the natural language queries. This process may ensure a comprehensive query (i.e., information query) that addresses both explicit user requests and inferred contextual requirements.

In block 205, the processing platform 103 may convert the information query into an embedded vector corresponding to a data schema vector index. This conversion may leverage a technique that encodes the semantic structure of the query, resulting in enabling the query to be represented in a mathematical format that captures its meaning in the context of the data schema. The embedded vector may align with the data schema vector index for retrieval of the relevant data.

In one instance, converting the information query into an embedded vector may include parsing the information query to extract semantic information. This may involve breaking down the query into its constituent components and identifying key phrases and relationships that convey the query's intent. The system may then employ a machine-learning model to map the extracted semantic information to a corresponding data schema within a predefined vector space model. In one instance, the machine-learning model has been trained upon historical data to recognize patterns and relationships between semantic elements and their respective schema representations. The mapped extracted semantic information may be encoded into the embedded vector representation. This may involve transforming the semantic mappings into a compact vector format that may be efficiently processed and compared with the system.

In block 207, the processing platform 103 may utilize a graph neural network (GNN)-based model to retrieve a plurality of ontologies from the data sources (e.g., external data sources 123) based upon the embedded vector representation. The plurality of ontologies may include one or more of a schema, context information, one or more vector index mapping, one or more taxonomies, or lineage information. The plurality of ontologies may provide a schema mapping and contextual relevance for responding to the natural language queries.

In one instance, retrieving the plurality of ontologies may include matching, utilizing the GNN-based model, the embedded vector representation against one or more ontology vectors in the data sources. The GNN-based model may capture complex relationships and structural dependencies within the data to evaluate how closely the embedded vectors align with various ontology representations. This matching process may involve analyzing the graph structure of the ontologies, where one or more nodes may represent key concepts or entities, and one or more edges may denote the relationships between them. Following the matching process, the processing platform 103 may select, utilizing the GNN-based model, the plurality of ontologies with a similarity score above a predetermined threshold (e.g., vector cosine similarity) with the embedded vector representation. In one example, this metric may quantify the angular distance between the embedded vector and the ontology vectors, providing a numerical value that reflects how closely related they are. By setting a threshold, the processing platform 103 may filter out less relevant ontologies, and may only consider those with strong contextual relevance. The selected plurality of ontologies may serve as a foundation for generating a comprehensive response to the original queries.

In block 209, the processing platform 103 may generate, utilizing the step back RAG method, a structured query based upon a RAG pattern (e.g., a predefined RAG pattern) and the plurality of ontologies identified in block 207.

In one instance, generating the structured query may include identifying, utilizing the step back RAG method, relationships between the plurality of ontologies and data schemas. The processing platform 103 may apply, utilizing the step back RAG method, integration key(s) to map the identified relationships between the plurality of ontologies and the data schema(s). The integration key(s) may serve as linking mechanisms that map the identified relationships between the ontologies and the schema. Then, the processing platform 103 may determine, utilizing the step back RAG method, the structured query based upon the mapped one or more relationships and the RAG pattern. The structured query may be configured to retrieve real-time data from the data sources by integrating mapped ontology based relationships with the data schemas.

In block 211, the processing platform 103 may execute the structured query upon the data sources to retrieve a result for the information query. In one instance, the structured queries may be transmitted to the data sources based upon the established relationships and mappings from the ontologies and schema(s). The execution process may utilize the integration keys that facilitate smooth interactions between data sources, allowing the quick retrieval of data elements.

In block 213, the processing platform 103 may generate the result to the natural language queries once the relevant data has been retrieved from the structured query execution. This process may include transforming the raw data into a user-friendly format, ensuring clarity and relevance. In one instance, the result for the natural language queries may include a query logic used for data retrieval to validate the result.

In block 215, the processing platform 103 may present the result to the user devices (e.g., user device 101) in a coherent manner, facilitating immediate understanding of the result. For example, the processing platform 103 may employ techniques such as summarization, contextualization, or rephrasing to present the information in a way that directly addresses the user's queries.

For example, the presenting may include outputting the result to the user via the user devices, or otherwise presenting the result to the user via the user device, such as a verbal or audible presentation via a voice bot or chatbot.

In one embodiment, the processing platform 103 may capture feedback indicator(s) from the user(s) regarding a response accuracy to the natural language queries. The processing platform 103 may update system parameter(s) for query matching based upon the response accuracy.

In another embodiment, the processing platform 103 may dynamically adjust query execution parameter(s) in response to real-time data availability and one or more performance metric(s). The processing platform 103 may perform a parallelized query execution across the data sources.

In one example embodiment, a user may ask a query (e.g., how many policies did we sell yesterday?) utilizing user device 101. The processing platform 103 may process the query to identify data points required to answer the query, such as "yesterday" and "policies sold by day". The processing platform 103 may convert the identified data points into numerical representation (e.g., embeddings), specifically one embedding for the temporal context (yesterday) and another for the relevant data structure (policies sold by day). The embeddings may yield one or more corresponding vector representations, such as [2,4,1,3,0,6,5,4,3,8] for the context of "yesterday" and [4,7,4,2,9,7,0,1,2,5] for the "policies sold by day".

The processing platform 103 may calculate a cosine similarity to determine how closely the embedded vector representation of the temporal context ("yesterday") aligns with the embedded vectors of various ontologies within the database. In this case, the relevant ontology for "yesterday" is determined to be aligned with the criteria of "Date of Now—1 day", linking it to the schema (Table: Policy, Column: PolicyBindDate). In this context, "PolicyBindDate" may be a specific column in the "policy" table where the dates of policy sales ae recorded.

Given the context derived from the ontology, the processing platform 103 may formulate an SQL query, which may specify that "yesterday" corresponds to the date one day prior to the current date. This is articulated in the context as "Ontology Yesterday is (Date of Now—1 day)" and it links to the schema that identifies the relevant data source, specifically the table named "policy" and the column "PolicyBindDate".

Building upon this context, the processing platform 103 may construct the structured SQL query needed to extract the required information from data sources. The formulated query may take the identified criteria into account and may be expressed as Select Count(1) from Policy where PolicyBindDate=DateDiff(Now( ), "Days", −1). This query may effectively count the number of new policies in force upon the specified date, leveraging the contextual information and data schema previously established. After executing the query, the processing platform 103 may retrieve the result for the query (e.g., 2362 new policies were in force or bound yesterday).

Exemplary Dynamic Data Retrieval Using Contextual Matching Flowchart

Figure 3:
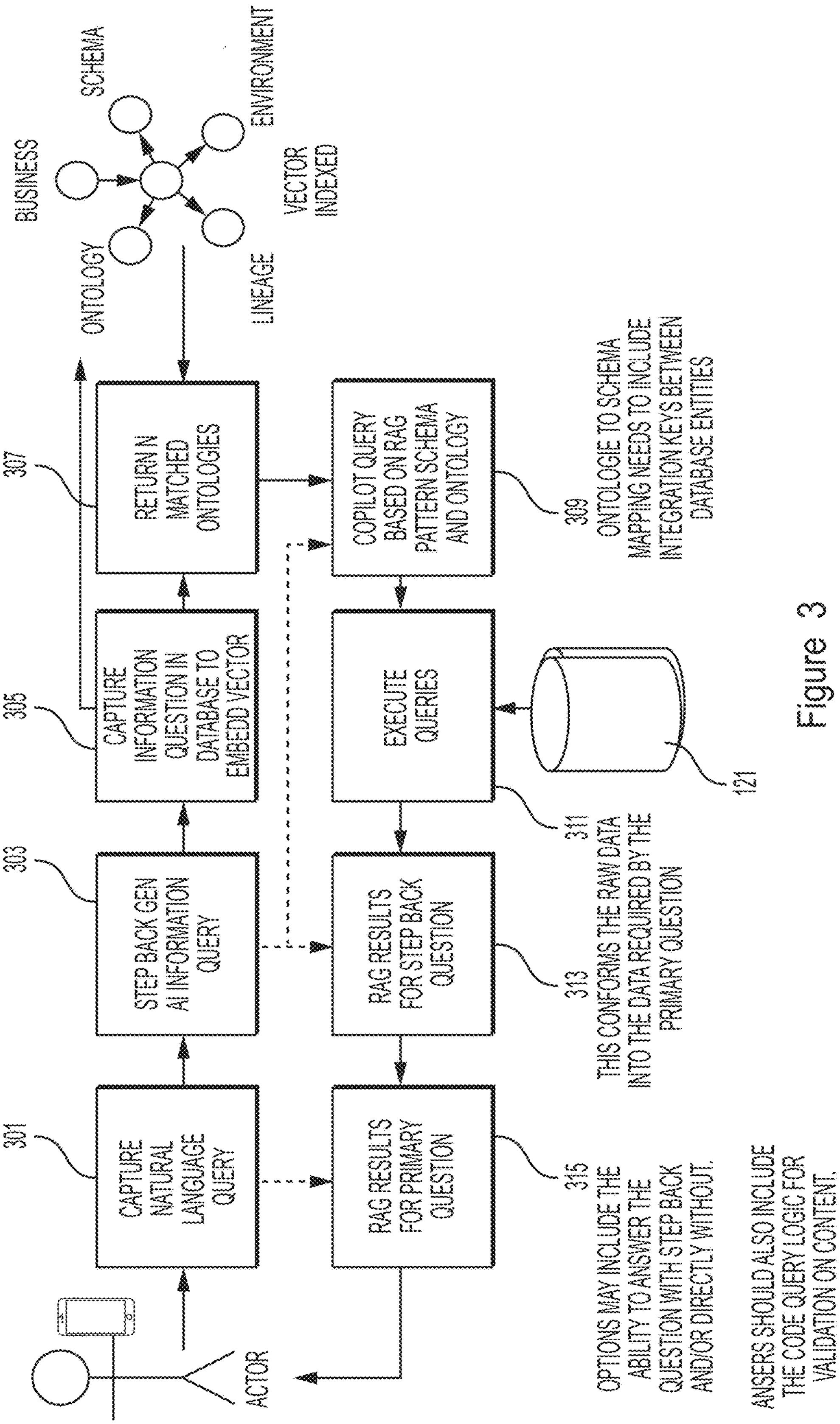
FIG. 3 is an exemplary flowchart of a computer-implemented or computer-based process for retrieving contextually relevant data to one or more queries using a step back RAG method augmented by GNN-based contextual matching, according to certain aspects of the disclosure.

FIG. 3 is an exemplary flowchart of a computer-implemented or computer-based process for retrieving contextually relevant data to one or more queries (e.g., natural language queries) using a step back RAG method augmented by GNN-based contextual matching techniques. In one instance, the processing platform 103 and/or any of the modules 105-119 may perform one or more portions of the process 300 and are implemented using, for instance, a chip set including a processor (e.g., processor 502) and a memory (e.g., memory 504) as shown in FIG. 5. As such, the processing platform 103 and/or any of modules 105-119 may be configured to facilitate accomplishing various parts of the process 300, as well as accomplishing embodiments of other processes described herein in conjunction with other components of the computing system 100. Although the process 300 is illustrated and described as a sequence of actions, operations, and/or functionality, it is contemplated that various embodiments of the process 300 may be performed in any order or combination and need not include all of the illustrated actions, operations, and/or functionality.

In one instance, a user (e.g., actor) may type or speak a natural language query via a user interface of a device (e.g., user device 101) seeking specific information or insight. For example, the user interface module 119 may be configured to capture these inputs intuitively and may ensure a smooth user experience.

In block 301, the processing platform 103, via the NLQP module 105, may process the natural language query by analyzing its structure, intent, and context. The processing platform 103 may break down the natural language input into a format that the system can interpret, thereby identifying key entities to ensure that the query is accurately understood.

In block 303, the processing platform 103, via the step-back generative AI Query module 107, may trigger the step back RAG method to determine the information needed to fully answer the query. The processing platform 103 may "step back" to identify any missing information or data elements that are needed to respond effectively. If any gaps or missing elements in the query are identified, the processing platform 103 may refine the query by leveraging generative AI model(s) to add a relevant context, ensuring that the query covers all necessary data. This "step back" process may ensure that the query is framed correctly.

In block 305, the processing platform 103, via the vector embedding and indexing module 109, may transform the query into an embedded vector representation. This may involve converting the query into a mathematical representation that may be efficiently matched to the underlying data structure. For example, the processing platform 103 may parse the query, map key entities to a data schema, and encode the query into a vector format. The processing platform 103 may ensure that the query aligns with the database schema by mapping the query to specific vectors, which may reflect the relationships between data entities in the database. For example, a query about "sales" may be linked to related data, such as product performance, within the embedded vector space.

In block 307, the processing platform 103, via the matching and retrieval module 111, may use the vector representation of the query to search through the system's knowledge base to return a list of N-matched ontologies that are relevant to the query. These ontologies may include taxonomies like business, schema, environment, vector index, or lineage. The processing platform 103 may provide a structured context to the query and map the query to the most relevant data sources, thereby effectively guiding the retrieval of the appropriate data. In one example, the processing platform 103 may utilize a GNN-based model to perform contextual matching of the user's query against business metadata. The GNN-based model may analyze the graph of data entities (e.g., nodes) and their relationships (e.g., edges) to return the most relevant ontologies that align with the query.

In block 309, the processing platform 103, via the query generation and execution module 113, may generate a final query that maps the retrieved ontologies to the underlying database schema. The query may be further refined based upon the matched ontologies, ensuring it captures both structured and unstructured data relevant to the user's original queries. The processing platform 103 may ensure that the query with the RAG pattern schema incorporates the integration keys between database entities.

In block 311, the processing platform 103, via the query generation and execution module 113, may execute the generated final query against the relevant data sources. This may involve running the final query upon the underlying data structures, and retrieving the most up-to-date data and contextually relevant information.

In block 313, the processing platform 103, via the RAG result processing module 115, may process the retrieved data from the relevant data sources, and may refine the retrieved raw data to fit the information needs determined during the "step back" phase. In such a manner, the processing platform 103 may ensure that the retrieved data corresponds to the contextual needs identified during the "step back" phase.

In block 315, the processing platform 103, via the RAG result processing module 115, may finalize the result for the user's query, and may either provide the answer directly from the refined data or initiate another "step back" phase, if further processing is needed. The result may also include the code query logic, allowing validation and transparency regarding how the information was extracted and computed.

In one instance, the processing platform 103, via the response generation and validation module 117, may synthesize the processed data into a structured response for the user. The processing platform 103 may format the answer, ensuring that it is clear, actionable, and informative. Finally, the processing platform 103, via the user interface module 119, may present a well-structured response to the user. For example, the presenting may include outputting the response to the user via the user devices, or otherwise presenting the response to the user via the user device, such as a verbal or audible presentation via a voice bot or chatbot. The response may include the answer to the user's query, as well as relevant contextual information. Depending upon the query, the user may also receive recommendations or visualizations.

This flow diagram of FIG. 3 may ensure that the user's natural language query is translated into actionable insights through a structured process that integrates advanced AI, vector representations, and ontology matching.

Exemplary Machine-Learning Techniques

Figure 4:
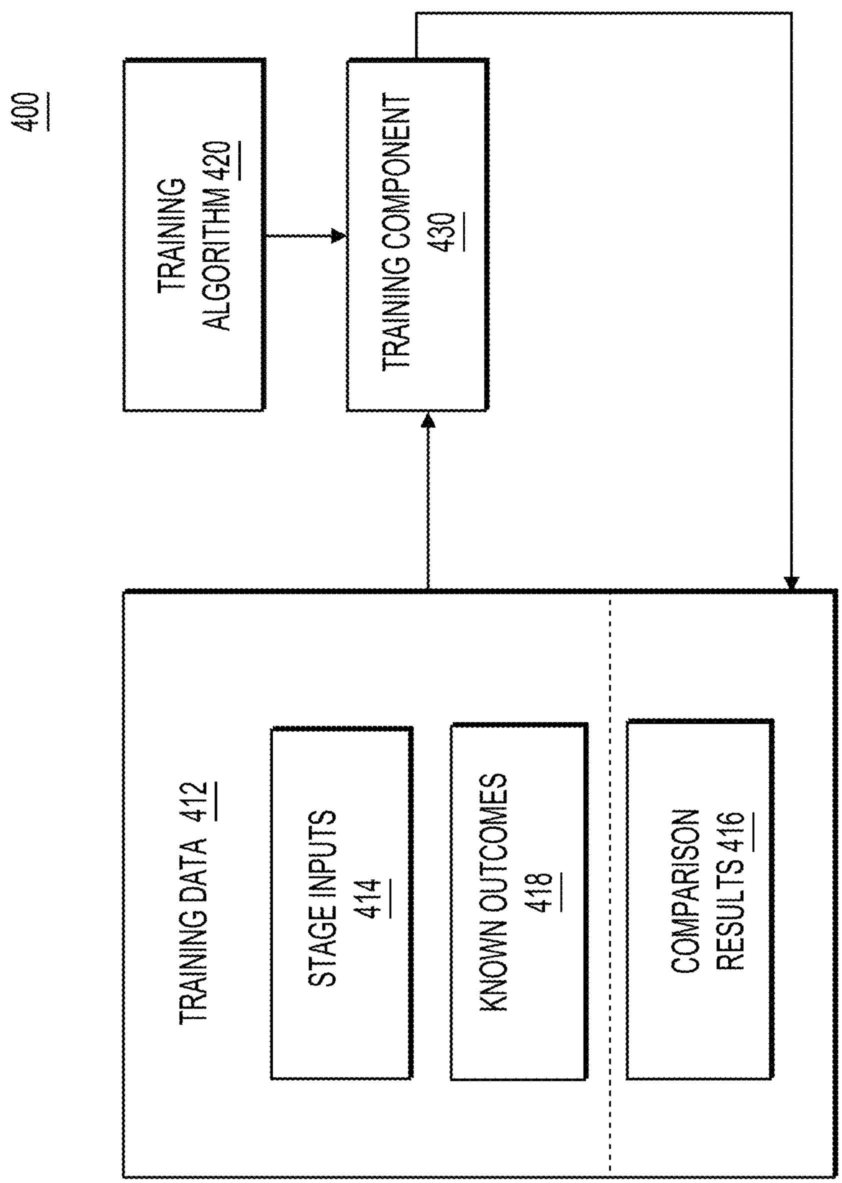
FIG. 4 shows an exemplary machine-learning training flow chart.

One or more implementations disclosed herein include and/or may be implemented using a machine-learning model. For example, one or more of the modules of processing platform 103 may be implemented using a machine-learning model and/or may be used to train the machine-learning model. A given machine-learning model may be trained using the data flow 400 of FIG. 4. Training data 412 may include one or more of stage inputs 414 and known outcomes 418 related to the machine-learning model to be trained. The stage inputs 414 may be from any applicable source including text, visual representations, data, values, comparisons, stage outputs, e.g., one or more outputs from one or more actions or operations from FIGS. 2 and 3. The known outcomes 418 may be included for the machine-learning models generated based upon supervised or semi-supervised training. An unsupervised machine-learning model may not be trained using known outcomes 418. Known outcomes 418 may include known or desired outputs for future inputs similar to or in the same category as stage inputs 414 that do not have corresponding known outputs.

The training data 412 and a training algorithm 420, e.g., one or more of the modules implemented using the machine-learning model and/or may be used to train the machine-learning model, may be provided to a training component 430 that may apply the training data 412 to the training algorithm 420 to generate the machine-learning model. According to an implementation, the training component 430 may be provided comparison results 416 that compare a previous output of the corresponding machine-learning model to apply the previous result to re-train the machine-learning model. The comparison results 416 may be used by training component 430 to update the corresponding machine-learning model. The training algorithm 420 may utilize machine-learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, models specifically discussed in the present disclosure, or the like.

The machine-learning model used herein may be trained and/or used by adjusting one or more weights and/or one or more layers of the machine-learning model. For example, during training, a given weight may be adjusted (e.g., increased, decreased, removed) based upon training data or input data. Similarly, a layer may be updated, added, or removed based upon training data/and or input data. The resulting outputs may be adjusted based upon the adjusted weights and/or layers.

In general, any process or operation discussed in this disclosure is understood to be computer-implementable, such as the processes illustrated in FIGS. 2 and 3 may be performed by one or more processors of a computer system as described herein. A process or process action or operation performed by one or more processors may also be referred to as an operation. The one or more processors may be configured to perform such processes by having access to instructions (e.g., software or computer-readable code) that, when executed by one or more processors, cause the one or more processors to perform the processes. The instructions may be stored in a memory of the computer system. A processor may be a central processing unit (CPU), a graphics processing unit (GPU), or any suitable type of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

Exemplary Computing Environment

FIG. 5 illustrates an implementation of a computer system that may execute techniques presented herein. The computer system 500 can include a set of instructions that can be executed to cause the computer system 500 to perform any one or more of the methods or computer based functions disclosed herein. The computer system 500 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 500 may operate in the capacity of a server or as a client user computer in a server-client user network environment, or as a peer computer system in a peer-to-peer (or distributed) network environment. The computer system 500 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 500 may be implemented using electronic devices that provide voice, video, or data communication. Further, while the computer system 500 is illustrated as a single system, the term "system" shall also be taken to include any collection of systems or sub-systems that individually or jointly execute a set, or multiple sets, of instructions to perform one or more computer functions.

As illustrated in FIG. 5, the computer system 500 may include a processor 502, e.g., a central processing unit (CPU), a graphics processing unit (GPU), or both. The processor 502 may be a component in a variety of systems. For example, the processor 502 may be part of a standard personal computer or a workstation. The processor 502 may be one or more processors, digital signal processors, application specific integrated circuits, field programmable gate arrays, servers, networks, digital circuits, analog circuits, combinations thereof, or other now known or later developed devices for analyzing and processing data. The processor 502 may implement a software program, such as code generated manually (i.e., programmed).

The computer system 500 may include a memory 504 that can communicate via bus 508. The memory 504 may be a main memory, a static memory, or a dynamic memory. The memory 504 may include, but is not limited to, computer readable storage media such as various types of volatile and non-volatile storage media, including but not limited to, random access memory, read-only memory, programmable read-only memory, electrically programmable read-only memory, electrically erasable read-only memory, flash memory, magnetic tape or disk, optical media and the like. In one implementation, the memory 504 includes a cache or random-access memory for the processor 502. In alternative implementations, the memory 504 is separate from the processor 502, such as a cache memory of a processor, the system memory, or other memory. The memory 504 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 504 is operable to store instructions executable by the processor 502. The functions, acts or tasks illustrated in the figures or described herein may be performed by the processor 502 executing the instructions stored in the memory 504. The functions, acts, or tasks are independent of the particular type of instruction set, storage media, processor or processing strategy and may be performed by software, hardware, integrated circuits, firmware, micro-code and the like, operating alone or in combination. Likewise, processing strategies may include multiprocessing, multitasking, parallel processing, and the like.

As shown, the computer system 500 may further include a display 510, such as a liquid crystal display (LCD), an organic light emitting diode (OLED), a flat panel display, a solid-state display, a cathode ray tube (CRT), a projector, a printer or other now known or later developed display device for outputting determined information. The display 510 may act as an interface for the user to see the functioning of the processor 502, or specifically as an interface with the software stored in the memory 504 or in the drive unit 506.

Additionally or alternatively, the computer system 500 may include an input/output device 512 configured to allow a user to interact with any of the components of the computer system 500. The input/output device 512 may be a number pad, a keyboard, or a cursor control device, such as a mouse, or a joystick, touch screen display, remote control, or any other device operative to interact with the computer system 500.

The computer system 500 may also or alternatively include drive unit 506 implemented as a disk or optical drive. The drive unit 506 may include a computer-readable medium 522 in which one or more sets of instructions 524, e.g., software, can be embedded. Further, instructions 524 may embody one or more of the methods or logic as described herein. The instructions 524 may reside completely or partially within the memory 504 and/or within the processor 502 during execution by the computer system 500. The memory 504 and the processor 502 also may include computer-readable media as discussed above.

In some systems, computer-readable medium 522 includes the set of instructions 524 or receives and executes the set of instructions 524 responsive to a propagated signal so that a device connected to network 530 can communicate voice, video, audio, images, or any other data over the network 530. Further, the set of instructions 524 may be transmitted or received over the network 530 via communication port or interface 520, and/or using bus 508. The communication port or interface 520 may be a part of the processor 502 or may be a separate component. The communication port or interface 520 may be created in software or may be a physical connection in hardware. The communication port or interface 520 may be configured to connect with a network 530, external media, the display 510, or any other components in computer system 500, or combinations thereof. The connection with the network 530 may be a physical connection, such as a wired Ethernet connection or may be established wirelessly as discussed below. Likewise, the additional connections with other components of the computer system 500 may be physical connections or may be established wirelessly. The network 530 may alternatively be directly connected to the bus 508.

While the computer-readable medium 522 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that causes a computer system to perform any one or more of the methods or operations disclosed herein. The computer-readable medium 522 may be non-transitory, and may be tangible.

The computer-readable medium 522 can include a solid-state memory such as a memory card or other package that houses one or more non-volatile read-only memories. The computer-readable medium 522 can be a random-access memory or other volatile re-writable memory. Additionally or alternatively, the computer-readable medium 522 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Computer system 500 may be connected to network 530. The network 530 may define one or more networks including wired or wireless networks. The wireless network may be a cellular telephone network, an 802.10, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 530 may include wide area networks (WAN), such as the Internet, local area networks (LAN), campus area networks, metropolitan area networks, a direct connection such as through a Universal Serial Bus (USB) port, or any other networks that may allow for data communication.

The network 530 may be configured to couple one computing device to another computing device to enable communication of data between the devices. The network 530 may generally be enabled to employ any form of machine-readable media for communicating information from one device to another. The network 530 may include communication methods by which information may travel between computing devices.

The network 530 may be divided into sub-networks. The sub-networks may allow access to all of the other components connected thereto or the sub-networks may restrict access between the components. The network 530 may be regarded as a public or private network connection and may include, for example, a virtual private network or an encryption or other security mechanism employed over the public Internet, or the like.

EXEMPLARY EMBODIMENTS

A computer-implemented method for generating a response to one or more natural language queries may be provided. The computer-implemented method may be performed by one or more local or remote processors of a computing system in communication with one or more local or remote data sources. The computer-implemented method may include: (1) receiving, by the one or more processors, the one or more natural language queries from one or more user devices; (2) generating, by the one or more processors, an information query based upon the one or more natural language queries, wherein the information query identifies one or more data elements for responding to the one or more natural language queries; (3) converting, by the one or more processors, the information query into an embedded vector corresponding to a data schema vector index; (4) based upon the embedded vector representation, utilizing, by the one or more processors, a graph neural network (GNN)-based model to retrieve a plurality of ontologies from the one or more data sources; (5) generating, by the one or more processors, a structured query based upon a pattern and the plurality of ontologies; (6) executing, by the one or more processors, the structured query upon the one or more data sources to retrieve a result for the information query; (7) generating, by the one or more processors, the result to the one or more natural language queries; and/or (8) presenting, by the one or more processors, the result to the one or more user devices.

Additionally or alternatively, generating the information query may include utilizing a step back retrieval-augmented generation (RAG) process. Similarly, generating the structured query may include utilizing a step back RAG process.

In some embodiments, the voice bots or chatbots may be configured to utilize AI and/or ML techniques, such as for input or output devices. For instance, a voice bot or chatbot may be a ChatGPT chatbot, an InstructGPT bot, a Codex bot, or a Google Bard bot. The voice bot or chatbot may employ supervised or unsupervised ML techniques, which may be followed by, and/or used in conjunction with, reinforced or reinforcement learning techniques. The voice bot or chatbot may employ the techniques utilized for ChatGPT, InstructGPT bot, Codex bot, or Google Bard bot.

In certain aspects, receiving the one or more natural language queries may include (i) parsing, by the one or more processors, the one or more natural language queries for identifying one or more key entities and one or more contexts; and/or (ii) extracting, by the one or more processors utilizing a natural language processing engine, one or more keywords and one or more phrases indicative of an intent of one or more users.

In certain embodiments, generating the information query may include (i) identifying, by the one or more processors, the one or more data sources and one or more schema structures that are relevant to the one or more key entities and the one or more contexts; and/or (ii) formulating, by the one or more processors, the information query by referencing the one or more data sources and the one or more schema structures.

In some embodiments, converting the information query into the embedded vector representation may include (i) parsing, by the one or more processors, the information query to extract semantic information; (ii) utilizing, by the one or more processors, a machine-learning model to map the extracted semantic information to a corresponding data schema within a predefined vector space model; and/or (iii) encoding, by the one or more processors, the mapped extracted semantic information into the embedded vector representation.

In various embodiments, retrieving the plurality of ontologies may include (i) matching, by the one or more processors utilizing the GNN-based model, the embedded vector representation against one or more ontology vectors in the one or more data sources; and/or (ii) selecting, by the one or more processors utilizing the GNN-based model, the plurality of ontologies with a similarity score above a predetermined threshold with the embedded vector representation. The plurality of ontologies may provide a schema mapping and a contextual relevance for responding to the one or more natural language queries.

In certain aspects, generating the structured query may include (i) identifying, by the one or more processors, one or more relationships between the plurality of ontologies and one or more data schemas; (ii) applying, by the one or more processors, one or more integration keys to map the identified one or more relationships between the plurality of ontologies and the one or more data schemas; and/or (iii) determining, by the one or more processors, the structured query based upon the mapped one or more relationships and the pattern.

Additionally or alternatively, the structured query may be configured to retrieve real-time data from the one or more data sources by integrating one or more mapped ontology based relationships with the one or more data schemas.

In certain embodiments, updating system parameters for query matching may include (i) capturing, by the one or more processors, one or more feedback indicators from one or more users regarding a response accuracy to the one or more natural language queries; and/or (ii) updating, by the one or more processors, one or more system parameters for query matching based upon the response accuracy.

In some embodiments, adjusting query execution parameters may include (i) adjusting, by the one or more processors, one or more query execution parameters in response to real-time data availability and one or more performance metrics; and/or (ii) performing, by the one or more processors, a parallelized query execution across the one or more data sources.

Additionally or alternatively, the result for the one or more natural language queries may include a query logic used for data retrieval to validate the result. The plurality of ontologies may include one or more of a schema, context information, one or more vector index mapping, one or more taxonomies, or lineage information.

A computer system for generating a response to one or more natural language queries may be provided. The computer system may include one or more processors of a computing system, and at least one non-transitory computer readable medium storing instructions which, when executed by the one or more processors, cause the one or more processors to perform operations. The computer system may perform operations including (1) receiving the one or more natural language queries from one or more user devices; (2) generating an information query based upon the one or more natural language queries, wherein the information query identifies one or more data elements for responding to the one or more natural language queries; (3) converting the information query into an embedded vector corresponding to a data schema vector index; (4) based upon the embedded vector representation, utilizing a GNN-based model to retrieve a plurality of ontologies from one or more data sources; (5) generating a structured query based upon a pattern and the plurality of ontologies; (6) executing the structured query upon the one or more data sources to retrieve a result for the information query; (7) generating the result to the one or more natural language queries; and/or (8) presenting the result to the one or more user devices.

Additionally or alternatively, generating the information query may include utilizing a step back RAG process. Similarly, generating the structured query may include utilizing a step back RAG process.

In certain aspects, receiving the one or more natural language queries may include (i) parsing the one or more natural language queries for identifying one or more key entities and one or more contexts; and/or (ii) extracting, utilizing a natural language processing engine, one or more keywords and one or more phrases indicative of an intent of one or more users.

In certain embodiments, generating the information query may include (i) identifying the one or more data sources and one or more schema structures that are relevant to the one or more key entities and the one or more contexts; and/or (ii) formulating the information query by referencing the one or more data sources and the one or more schema structures.

A non-transitory computer readable medium for generating a response to one or more natural language queries may be provided. The non-transitory computer readable medium may store instructions which, when executed by one or more processors, cause the one or more processors to perform operations. The one or more processors may perform operations including: (1) receiving the one or more natural language queries from one or more user devices; (2) generating an information query based upon the one or more natural language queries, wherein the information query identifies one or more data elements for responding to the one or more natural language queries; (3) converting the information query into an embedded vector corresponding to a data schema vector index; (4) based upon the embedded vector representation, utilizing a GNN-based model to retrieve a plurality of ontologies from one or more data sources; (5) generating a structured query based upon a pattern and the plurality of ontologies; (6) executing the structured query upon the one or more data sources to retrieve a result for the information query; (7) generating the result to the one or more natural language queries; and/or (8) presenting the result to the one or more user devices.

Additionally or alternatively, generating the information query or the structured query may include utilizing a step back RAG process.

Additional Considerations

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the actions, operations, and/or functionality of computer-implemented methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Finally, unless a claim element is defined by expressly reciting the word "means" and a function without the recital of any structure, it is not intended that the scope of any claim element be interpreted based upon the application of 35 U.S.C. § 112(f).

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in exemplary configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied upon a non-transitory, tangible machine-readable medium) or hardware. In hardware, the routines, etc., are tangible units capable of performing certain operations and may be configured or arranged in a certain manner. In exemplary embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may include dedicated circuitry or logic that is permanently configured (e.g., as a special-purpose processor, such as a field programmable gate array (FPGA) or an application-specific integrated circuit (ASIC) to perform certain operations). A hardware module may also include programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate upon a resource (e.g., a collection of information).

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some exemplary embodiments, include processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

What is claimed is:

1. A computer-implemented method for generating a response to one or more natural language queries, the computer-implemented method performed by one or more processors of a computing system in communication with one or more data sources, the computer-implemented method comprising:

receiving, by the one or more processors, the one or more natural language queries from one or more user devices;

generating, by the one or more processors, an information query based upon the one or more natural language queries, wherein the information query identifies one or more data elements for responding to the one or more natural language queries;

converting, by the one or more processors, the information query into an embedded vector representation corresponding to a data schema vector index;

based upon the embedded vector representation, utilizing, by the one or more processors, a graph neural network (GNN)-based model to retrieve a plurality of ontologies from the one or more data sources;

identifying, by the one or more processors, one or more relationships between the plurality of ontologies and one or more data schemas;

mapping, by the one or more processors, the identified one or more relationships between the plurality of ontologies and the one or more data schemas based upon one or more integration keys;

determining, by the one or more processors, a structured query based upon the mapped one or more relationships and one or more patterns;

executing, by the one or more processors, the structured query upon the one or more data sources to retrieve a result for the information query;

generating, by the one or more processors, the result to the one or more natural language queries; and presenting, by the one or more processors, the result to the one or more user devices.

2. The computer-implemented method of claim 1, wherein generating the information query includes utilizing a step back retrieval-augmented generation (RAG) process.

3. The computer-implemented method of claim 1, wherein generating the structured query includes utilizing a step back retrieval-augmented generation (RAG) process.

4. The computer-implemented method of claim 1, wherein receiving the one or more natural language queries comprises:

parsing, by the one or more processors, the one or more natural language queries for identifying one or more key entities and one or more contexts; and extracting, by the one or more processors utilizing a natural language processing engine, one or more keywords and one or more phrases indicative of an intent of one or more users.

5. The computer-implemented method of claim 4, wherein generating the information query comprises:

identifying, by the one or more processors, the one or more data sources and one or more schema structures that are relevant to the one or more key entities and the one or more contexts; and formulating, by the one or more processors, the information query by referencing the one or more data sources and the one or more schema structures.

6. The computer-implemented method of claim 1, wherein converting the information query into the embedded vector representation, comprises:

parsing, by the one or more processors, the information query to extract semantic information;

utilizing, by the one or more processors, a machine-learning model to map the extracted semantic information to a corresponding data schema within a predefined vector space model; and encoding, by the one or more processors, the mapped extracted semantic information into the embedded vector representation.

7. The computer-implemented method of claim 6, wherein retrieving the plurality of ontologies comprises:

matching, by the one or more processors utilizing the GNN-based model, the embedded vector representation against one or more ontology vectors in the one or more data sources; and selecting, by the one or more processors utilizing the GNN-based model, the plurality of ontologies with a similarity score above a predetermined threshold with the embedded vector representation, wherein the plurality of ontologies provide a schema mapping and a contextual relevance for responding to the one or more natural language queries.

8. The computer-implemented method of claim 1, wherein the structured query is configured to retrieve real-time data from the one or more data sources by integrating one or more mapped ontology based relationships with the one or more data schemas.

9. The computer-implemented method of claim 1, further comprising:

capturing, by the one or more processors, one or more feedback indicators from one or more users regarding a response accuracy to the one or more natural language queries; and updating, by the one or more processors, one or more system parameters for query matching based upon the response accuracy.

10. The computer-implemented method of claim 1, further comprising:

adjusting, by the one or more processors, one or more query execution parameters in response to real-time data availability and one or more performance metrics; and performing, by the one or more processors, a parallelized query execution across the one or more data sources.

11. The computer-implemented method of claim 1, wherein the result for the one or more natural language queries includes a query logic used for data retrieval to validate the result.

12. The computer-implemented method of claim 1, wherein the plurality of ontologies include one or more of a schema, context information, one or more vector index mapping, one or more taxonomies, or lineage information.

13. A computer system for generating a response to one or more natural language queries, comprising:

one or more processors of a computing system; and at least one non-transitory computer readable medium storing instructions which, when executed by the one or more processors, cause the one or more processors to perform operations comprising:

receiving the one or more natural language queries from one or more user devices;

generating an information query based upon the one or more natural language queries, wherein the information query identifies one or more data elements for responding to the one or more natural language queries;

converting the information query into an embedded vector representation corresponding to a data schema vector index;

based upon the embedded vector representation, utilizing a graph neural network (GNN)-based model to retrieve a plurality of ontologies from one or more data sources;

identifying one or more relationships between the plurality of ontologies and one or more data schemas;

mapping, by the one or more processors, the identified one or more relationships between the plurality of ontologies and the one or more data schemas based upon one or more integration keys;

determining a structured query based upon the mapped one or more relationships and one or more patterns;

executing the structured query upon the one or more data sources to retrieve a result for the information query;

generating the result to the one or more natural language queries; and presenting the result to the one or more user devices.

14. The system of claim 13, wherein generating the information query includes utilizing a step back retrieval-augmented generation (RAG) process.

15. The system of claim 13, wherein generating the structured query includes utilizing a step back retrieval-augmented generation (RAG) process.

16. The system of claim 13, wherein receiving the one or more natural language queries comprises:

parsing the one or more natural language queries for identifying one or more key entities and one or more contexts; and extracting, utilizing a natural language processing engine, one or more keywords and one or more phrases indicative of an intent of one or more users.

17. The system of claim 16, wherein generating the information query comprises:

identifying the one or more data sources and one or more schema structures that are relevant to the one or more key entities and the one or more contexts; and formulating the information query by referencing the one or more data sources and the one or more schema structures.

18. A non-transitory computer readable medium for generating a response to one or more natural language queries, the non-transitory computer readable medium storing instructions which, when executed by one or more processors of a computing system, cause the one or more processors to perform operations comprising:

receiving the one or more natural language queries from one or more user devices;

generating an information query based upon the one or more natural language queries, wherein the information query identifies one or more data elements for responding to the one or more natural language queries;

converting the information query into an embedded vector representation corresponding to a data schema vector index;

based upon the embedded vector representation, utilizing a graph neural network (GNN)-based model to retrieve a plurality of ontologies from one or more data sources;

identifying one or more relationships between the plurality of ontologies and one or more data schemas;

mapping, by the one or more processors, the identified one or more relationships between the plurality of ontologies and the one or more data schemas based upon one or more integration keys;

determining a structured query based upon the mapped one or more relationships and one or more patterns;

executing the structured query upon the one or more data sources to retrieve a result for the information query;

generating the result to the one or more natural language queries; and presenting the result to the one or more user devices.

19. The non-transitory computer readable medium of claim 18, wherein generating the information query or the structured query includes utilizing a step back retrieval-augmented generation (RAG) process.

20. The computer-implemented method of claim 1, wherein identifying the one or more relationships between the plurality of ontologies and the one or more data schemas comprises:

extracting, by the one or more processors, semantic data from the one or more natural language queries, wherein the semantic data includes one or more key entities, one or more relationships, or one or more intents; and mapping, by the one or more processors, the extracted semantic data to a relevant metadata context including the one or more data schemas or one or more entities.

* * * * *